United States Patent [19]

Providenza et al.

[11] Patent Number: 5,347,631
[45] Date of Patent: Sep. 13, 1994

[54] BIT ALIGNED DATA BLOCK TRANSFER METHOD AND APPARATUS

[75] Inventors: John R. Providenza, Beaverton; Lee Boekelheide, Tigard, both of Oreg.

[73] Assignee: Network Computing Devices, Inc., Mountain View, Calif.

[21] Appl. No.: 135,797

[22] Filed: Oct. 12, 1993

Related U.S. Application Data

[63] Continuation of Ser. No. 617,198, Nov. 23, 1990.

[51] Int. Cl.$^5$ .............................................. G06F 15/62
[52] U.S. Cl. ........................................ 395/164; 395/425
[58] Field of Search ............................ 395/162–166, 395/127, 133, 138, 157, 425; 345/121, 153, 185, 189, 191

[56] References Cited

U.S. PATENT DOCUMENTS

| | | | |
|---|---|---|---|
| 4,672,680 | 6/1987 | Middleton | 395/138 |
| 4,692,944 | 9/1987 | Masuzaki et al. | 382/41 |
| 4,860,248 | 8/1989 | Lumelsky | 364/900 |
| 4,897,636 | 1/1990 | Nishi et al. | 345/121 |

Primary Examiner—Dale M. Shaw
Assistant Examiner—Kee M. Tung
Attorney, Agent, or Firm—Dellett and Walters

[57] ABSTRACT

The number of required clock periods in a bit aligned block transfer operation may be reduced by analyzing the logical relationship between source, destination and pattern operands prior to fetching these operands from memory. If the result of the raster operation can be determined without actually using the value of any of the operands, the result is provided without reading memory values. When the raster operation will have no effect on the existing destination operand, the write operation is also canceled.

11 Claims, 4 Drawing Sheets

| Raster OP | SRC | DEST | Operation | Memory Cycle Reduction |
|---|---|---|---|---|
| DEST_VAL=DEST AND SRC | 0 | x | read SRC, write 0 | 3 --> 2 |
| DEST_VAL=DEST AND SRC | 1 | x | read SRC | 3 --> 1 |
| DEST_VAL=DEST OR SRC | 1 | x | read SRC, write 1 | 3 --> 2 |
| DEST_VAL=DEST OR SRC | 0 | x | read SRC | 3 --> 1 |
| DEST_VAL=DEST XOR SRC | 1 | x | read SRC, RMW DEST | 3 --> 3 |
| DEST_VAL=DEST XOR SRC | 0 | x | read SRC | 3 --> 1 |

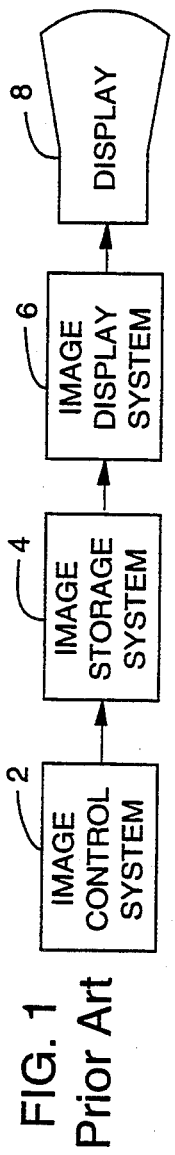

| Raster OP | SRC | DEST | Operation | Memory Cycle Reduction |
|---|---|---|---|---|
| DEST_VAL=DEST AND SRC | 0 | x | read SRC, write 0 | 3 --> 2 |
| DEST_VAL=DEST AND SRC | 1 | x | read SRC | 3 --> 1 |
| DEST_VAL=DEST OR SRC | 1 | x | read SRC, write 1 | 3 --> 2 |
| DEST_VAL=DEST OR SRC | 0 | x | read SRC | 3 --> 1 |
| DEST_VAL=DEST XOR SRC | 1 | x | read SRC, RMW DEST | 3 --> 3 |
| DEST_VAL=DEST XOR SRC | 0 | x | read SRC | 3 --> 1 |

FIG. 3

| Raster OP | PAT | SRC | DEST | Operation | Memory Cycle Reduction |
|---|---|---|---|---|---|
| DEST_VAL=(DEST AND PAT) OR (SRC AND ~PAT) | 0 | x | x | read PAT, read SRC write DEST | 4 --> 3 |
| DEST_VAL=(DEST AND PAT) OR (SRC AND ~PAT) | 1 | x | x | read PAT | 4 --> 1 |
| DEST_VAL=(DEST) OR (SRC AND PAT) | 0 | x | x | read PAT | 4 --> 1 |
| DEST_VAL=(DEST) OR (SRC AND PAT) | 1 | 0 | x | read PAT, read SRC | 4 --> 2 |
| DEST_VAL=(DEST) OR (SRC AND PAT) | 1 | 1 | x | read PAT, read SRC write DEST | 4 --> 3 |

RASTER OPERATION --

DEST_VAL = (DEST AND PAT) OR (SCR AND ~PAT)

RASTER OPERATION TRUTH TABLE

| RASTER OPERAND | | | RASTER OPERATION VALUE | |
|---|---|---|---|---|
| PAT | SRC | DEST | DEST_VAL | RASTER OPCODE BIT |
| 0 | 0 | 0 | 0 | ROP0 |
| 0 | 0 | 1 | 0 | ROP4 |
| 0 | 1 | 0 | 1 | ROP2 |
| 0 | 1 | 1 | 1 | ROP6 |
| 1 | 0 | 0 | 0 | ROP1 |
| 1 | 0 | 1 | 1 | ROP5 |
| 1 | 1 | 0 | 0 | ROP3 |
| 1 | 1 | 1 | 1 | ROP7 |

| DEST Decode Logic | | | |
|---|---|---|---|
| DEST1 | DEST0 | Function | Optimizations |
| 0 | 0 | Clr | No Read |
| 0 | 1 | Toggle | None |
| 1 | 0 | No-Op | No Read, No Write |
| 1 | 1 | Set | No Read |

BIT ALIGNED DATA BLOCK TRANSFER METHOD AND APPARATUS

This is a continuation of copending application(s) Ser. No. 07/617,198 filed on Nov. 23, 1990.

BACKGROUND OF THE INVENTION

The present invention relates to bit aligned block transfer (bitblt) hardware used to copy or move data from one area of memory to another within the display hardware of a computer system.

A standard architecture for display hardware includes an image control system for creating, modifying and moving image data, an image storage system for holding the image data after being processed by the image control system, and an image display system for translating the stored image data to a visible image on a cathode-ray-tube (CRT). A standard image display system uses a technique called raster scanning to display stored image data. In a raster scan, a beam starts in the upper left hand corner of a display screen and moves horizontally across the screen. The beam is turned off when it reaches the end of the horizontal line and is repositioned at the beginning of the next lower horizontal line. This process repeats until the beam reaches the lower right hand corner of the screen after which the beam is turned off and returned to the upper left hand corner where the process repeats. In a bit mapped system, the raster screen is treated as an array of picture elements (pixels) which have a controllable intensity and/or color. To control the pixel outputs on the screen, the image control system modifies the data value in an associated image storage address location of memory.

The quality of the image displayed on the screen is improved by increasing the number of raster lines and the number of pixels displayed in each raster line. However, increasing the number of pixels increases the time the image control system takes to modify a screen off image data. When blocks of data are modified on a screen, the image processor conventionally reads the data value associated with each pixel located in the block, modifies it, and writes each pixel into a memory location. Therefore, the larger the block of data, the longer the time required for the image processor to update the screen. Furthermore, with increased pixel resolution a given size block of image data contains more pixel data to process. To relieve the burden on the image control processor when large blocks of data are changed, special bitblt hardware has been developed. Bitblt hardware modifies data arrays faster than a general purpose image control processor and frees the image processor to perform additional functions. A bitblt involves reading a data value from the image storage system, performing a "raster operation" on the data and writing the result back into the image storage system. This process is repeated for each pixel in the defined block to be altered. Raster operations are logic functions that use the source data value and the destination data value to modify the bitblt pixel values. Since a period of time is required to move the data to and from the image storage system, data transfers can be a major bottleneck in performing bitblt operations.

SUMMARY OF THE INVENTION

According to the present invention in a particular embodiment thereof, raster operations are analyzed before they are actually performed to eliminate unnecessary logic operations and data transfers.

The present invention reduces the number of required clock periods by analyzing the logic relationship between the source and destination operands prior to fetching either operand from memory. If the result of the raster operation can be determined without actually using the value of either or both of the operands, the reading of unnecessary values can be eliminated. The new destination result can then be loaded into the address location of the previous destination operand. In addition, if the raster operation will have no effect on the existing destination operand, the write operation is canceled to reduce the number of memory cycles.

To generate the desired image more effectively, a data pattern is often used to fill areas in a graphic display. Thus, a pattern operand is employed along with source and destination operands in the raster operation. In a modification of the present invention, the logical relationship between pattern, source and destination operands is analyzed. It is possible to preview the effect that the pattern operand will have on the destination value prior to performing the entire raster operation and thus the number of clock cycles required to perform a raster operation involving a pattern operand can also be reduced.

According to another modification, a control signal can be sent to the destination memory operand address instead of actually writing a new destination value into memory. When special bitblt memory devices are used, the memory control signal can be sent to the image memory address, commanding it to perform certain primitive binary operations. These binary operations modify the destination operand in such a way as to produce a value equal to the new destination value as would have occurred from writing the result of the raster operation back into memory in the usual manner. The system therefore further reduces the number of logical operations and memory cycles which the image creation system has to perform.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a block diagram of a conventional architecture for a raster display system, FIG. 2 is a chart showing a representative sample of two operand raster operations and the number of memory cycles that can be saved according to the invention, FIG. 3 is a chart showing a representative sample of three operand raster operations and the number of memory cycles that can be saved by using the invention.

DETAILED DESCRIPTION

Figure 4A:
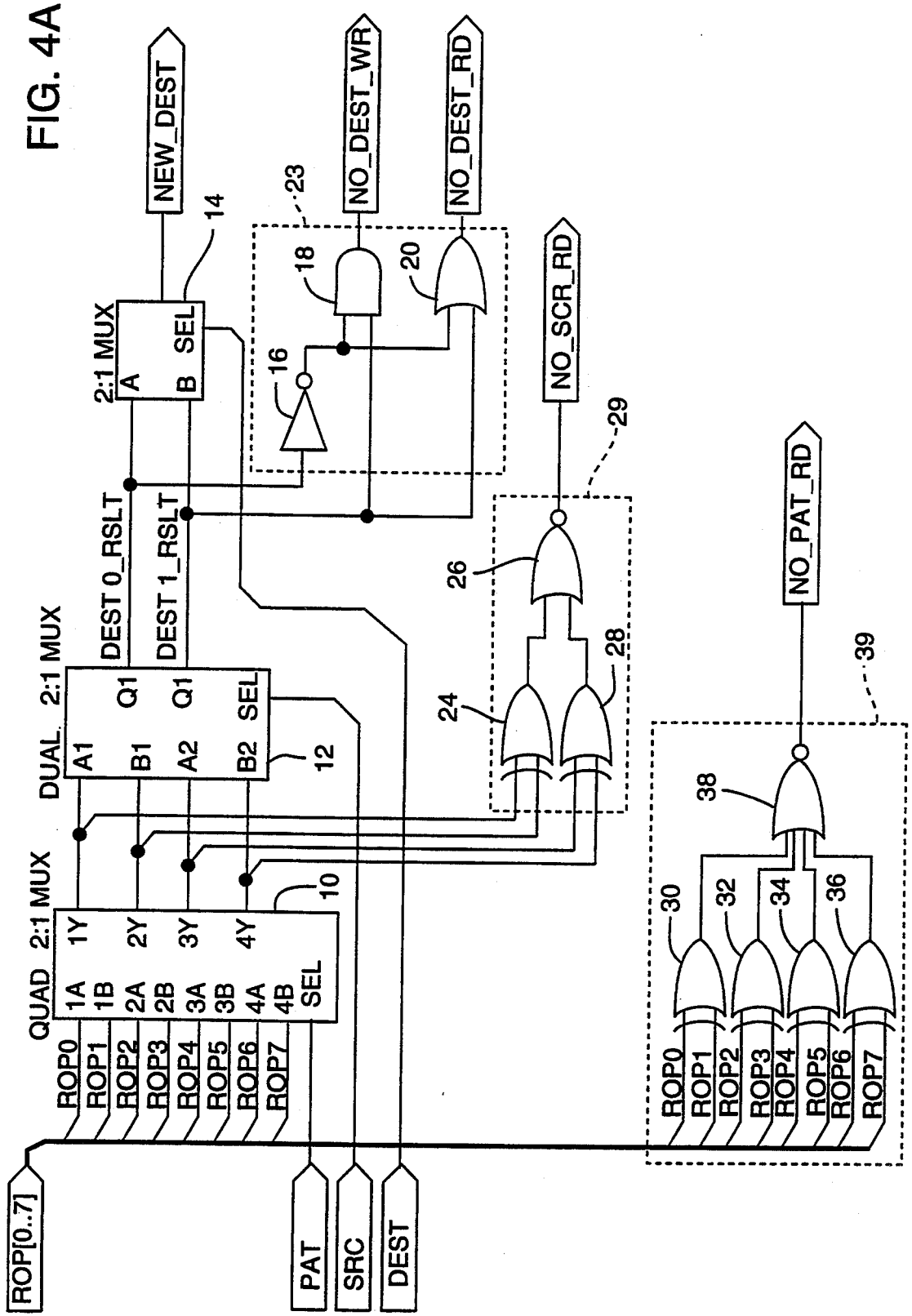
FIG. 4A is a block diagram of the invention comprising a BLT engine for reducing the time required to perform raster operations for single bit pixel data.

FIG. 1 illustrates the basic architecture of a raster display system wherein image control system 2 supplies address, data and control to image storage system 4 to manipulate image data. The information in image storage system 4 is translated by image display system 6 into signals which control display screen 8. The time required to output a new screen of data to display system 8 is usually limited by the time it takes the image control system to update a frame of data within image storage system 4. The operations that create and manipulate the image data in image memory 4 are referred to as "raster operations", there being several hundred raster operations typically performed on image data. An example of a raster operation is given as follows:

$$DEST\_VAL = (DEST) \text{ AND } (SRC) \quad (1)$$

where DEST_VAL is the destination value generated by performing a logical AND between the destination operand DEST and the source operand SRC. Traditionally, the logical operation above is performed by reading source operand SRC from memory, loading it into a register, reading destination operand DEST and loading it into a second register, ANDing the two registers together, and then writing the destination value DEST_VAL back into the destination memory address. The raster operation therefore requires three memory cycles and one processor cycle. Furthermore, a memory read or write cycle typically takes longer than a logic function.

Increasing memory speed has been the primary method in reducing the time required to provide a raster operation, but this avenue of improvement is limited by present memory fabrication technology. A significant effect in the time required for a raster operation can be achieved if the number of memory operations are reduced, and it is accordingly a purpose of the present invention to reduce the number of memory operations. To explain how the number of memory cycles can be reduced, the same AND operation as described in equation 1 will be considered.

When a logical AND is performed between two operands, it is possible that either operand can control the result without reference to the second operand value. For example, in equation 1 if SRC=0 and DEST is not known, the result of ANDing the two operands together will be zero regardless of the value of DEST. Thus, $$(DEST) \text{ AND } (0) = 0.$$

In the same AND operation, if SRC=1 and the value of DEST is not known, then it can be seen that the result will always be equal to the value of DEST or, $$(DEST) \text{ AND } (1) = DEST. \quad 60$$

The number of memory operations required to write the correct result into the destination memory location is therefore dependent on the value of SRC. When SRC=0, the value in DEST must be zero, so in addition to the SRC memory fetch, a destination write is required to clear the value presently in DEST. If SRC=1, however, the value in the destination memory location will remain the same. Therefore, the only necessary memory operation is a fetch of the SRC operand. It is significant that for either value of SRC the number of memory operations can be reduced over standard logic operations whereby a time savings can be achieved regardless of the source operand value.

It is another purpose of this invention to minimize the number of memory cycles for each raster operation regardless of the given operand values. Therefore, if the raster operation requires two memory access cycles when SRC=1 but requires three memory access cycles when SRC=0, the system according to the present invention will enable the memory control system to conduct the minimum number of memory operations necessary.

FIG. 2 illustrates the reduction in number of memory cycles possible for typical two operand raster operations. For various values of the source operand SRC, it can be seen that in most instances the number of memory cycles can be reduced since it is not necessary in every case to read the destination operand to generate a result.

FIG. 3 illustrates the number of memory cycles that can be eliminated in typical logic operations containing three operands. In this case, pattern data is used in combination with source and destination information to fill in graphic areas more efficiently. As in the instance of source and destination operands, pattern operands do not necessarily have to be fetched from memory in order to determine the final value of the logic operation in which the pattern is applied. In the alternative, a given pattern value may render the source and/or destination operands unnecessary for determination of the final destination value. A typical raster operation involving pattern information is given as follows:

$$DEST\_VAL = (DEST \text{ AND } PAT) \text{ OR } (SRC \\ \text{AND } \sim PAT) \quad (2)$$

where DEST_VAL is the value to be written back into the destination operand memory location, DEST is the destination memory operand, SRC is the source memory operand, and PAT is the pattern data operand. Normally, this operation requires four memory cycles to derive an answer: three memory cycles to read the source, destination and pattern operands, and one memory cycle to write the result back into memory.

It can be determined from the above raster operation that if PAT=0, then DEST_VAL is equal to SRC. To explain further, the first half of the operation (DEST AND PAT) will always be zero if PAT=0;

$$(DEST) \text{ AND } (0) = 0;$$

and therefore the final value for equation 2 is dependent on the second half of the operation (SRC AND ~PAT). However, if ~PAT=1, the second half of the equation is equal to SRC, $$(SRC) \text{ AND } (1) = SRC.$$

Thus the entire operation is equal to SRC or, $$DEST\_VAL = (0) \text{ OR } (SRC) = SRC.$$

Consequently, only three memory cycles will be needed to perform the operation: the first to read the pattern operand, the second to read the source operand, and the third to write the source operand value into the destination operand memory location. FIG. 3, entry 1, lists the raster operation shown in equation 2, and the required pattern value, (PAT=0) which will reduce the number of memory cycles from four to three. It can also be seen from line 1 that the actual values of SRC and DEST do not have to be known to generate a result.

From FIG. 3, second entry, it is noted that for the same raster operation described above, the number of memory cycles can be reduced further if the pattern operand is equal to one (PAT=1). Analyzing equation 2 for PAT=1, the first half of the operation will be equal to DEST since DEST is ANDed with PAT or, (DEST AND 1)=DEST.

The second half of equation 2 will always be equal to zero inasmuch as the inverse of the pattern value (~PAT) will be ANDed with the source operand. Since ~PAT=0, (SRC) AND (0)=0.

ORing the first and second halves of equation 2 results in:

DEST_VAL=(DEST) OR (0)=DEST.

Since the destination value will be equal to the value already stored in the destination memory location, there is no need to write any result back into memory. Thus, the only memory cycle required for determining the value of equation 2 if the pattern operand is equal to one (PAT=1), is the memory read to determine the pattern operand value. As shown in FIG. 3, second entry, the number of memory cycles can then be reduced from four to one.

The invention reduces the time required to perform certain raster operations further by eliminating unnecessary logic operations. As can be noted from equation 2, there is no need to perform the AND and OR logical operations if the pattern value is known. For some complex operations, propagation delay time will also be eliminated by reduction in logic hardware.

Figure 5:
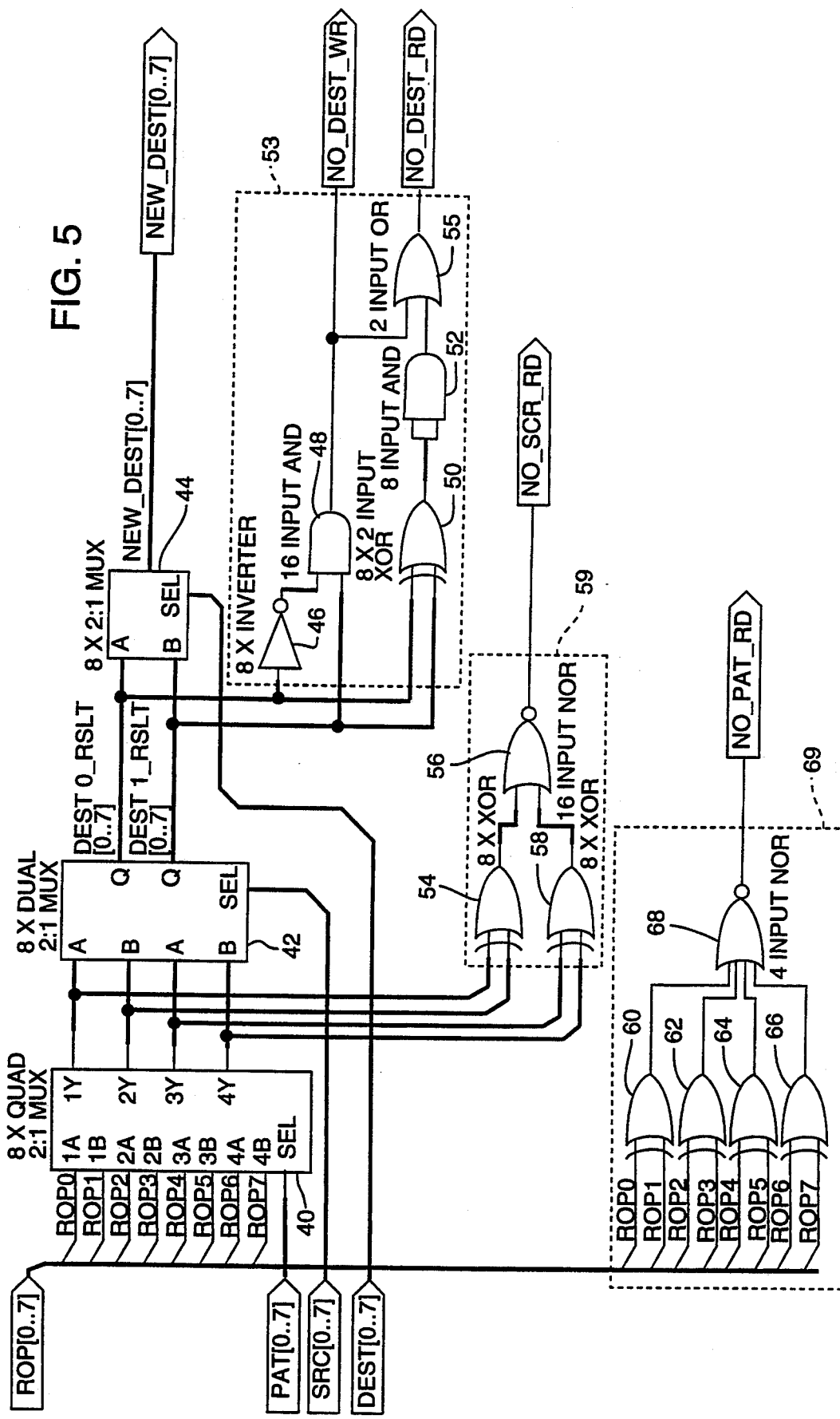
FIG. 5 is a block diagram of the invention comprising a BLT engine for reducing the time required to perform raster operations for eight bit pixel data.

FIG. 4A illustrates an implementation of the invention which allows for the processing of multiple raster operands on single bit pixel data. Single bit control is used in monochrome systems to generate a single color and light intensity on the screen. FIG. 5 will illustrate how the circuit is expanded for eight bit control.

Referring to FIG. 4A, an eight bit raster opcode ROP [0 . . . 7] determines memory read/modify/write requirements by mapping specific raster operations to given opcode values. Eight bit raster opcode bus ROP [0 . . . 7] is connected to a quad multiplexer 10. The first bit of the raster opcode bus ROP0 is connected to input lead 1A and the second bit of the raster opcode bus ROP1 is connected to input lead 1B. The remaining six bits of the raster opcode bus are connected to multiplexer 10 sequentially, i.e., ROP2 is connected to input lead 2A, ROP3 to input lead 2B, ROP4 to input lead 3A, ROP5 to input lead 3B, ROP6 to input lead 4A, and ROP7 to input lead 4B. The pattern operand value PAT is applicable to the gate select lead SEL of multiplexer 10.

When the pattern operand bit is low (PAT=0), the signal on input lead 1A of multiplexer 10 is output on lead 1Y, the signal on input lead 2A is output on lead 2Y, the signal on lead 3A is output on lead 3Y, and the signal on lead 4A is output on lead 4Y. However, when the pattern operand is equal to one (PAT=1), the value on lead 1B is output on lead 1Y, the value on lead 2B is output on lead 2Y, and so on.

The output leads from multiplexer 10 are coupled to multiplexer 12 so the source operand may further decode the raster opcode. Multiplexer 10 output lead 1Y is connected to multiplexer 12 input lead A1, multiplexer 10 output lead 2Y is connected to multiplexer 12 input lead B1, multiplexer 10 output lead 3Y is connected to multiplexer 12 input lead A2, and multiplexer 10 output lead 4Y is connected to multiplexer 12 input lead B2, while the source operand value SRC is receivable at the select lead of multiplexer 12 to choose between the A or B values on the input leads. If the source operand value is equal to zero (SRC=0), the value on multiplexer 12 input lead A1 is output on lead Q1 and the value on input lead A2 is output on lead Q2. However, if the source operand bit is equal to one (SRC=1), then the value on input lead B1 is output on lead Q1 and the value on input lead B2 is output on lead Q2.

Output lead Q1 from multiplexer 12 is connected to input lead A of multiplexer 14 while output lead Q2 from multiplexer 12 is connected to input lead B of multiplexer 14, the selection lead on multiplexer 14 being adapted to receive the destination operand value DEST. If the destination operand is equal to zero (DEST=0), the output of multiplexer 14 is equal to the value on input lead A, but if the output destination operand is equal to one (DEST=1), the output of multiplexer 14 is equal to the value on input lead B.

Pattern decode circuit 39 decodes raster opcode ROP[0 . . . 7] to determine if a pattern read is necessary. In pattern decode circuit 39, XOR gate 30 is supplied ROP0 and ROP1, XOR gate 32 is supplied ROP2 and ROP3, XOR gate 34 is supplied ROP4 and ROP5, and XOR gate 36 is supplied ROP6 and ROP7. The outputs of XOR gates 30, 32, 34 and 36 are coupled as inputs to four input NOR gate 38 which is active high when there is no need to read the pattern data from the image storage memory.

The output of multiplexer 10 also supplies source decode circuit 29 for determining if a source operand read is required. Outputs 1Y and 2Y from multiplexer 10 are connected to XOR gate 24, while outputs 3Y and 4Y are provided to XOR gate 28. The outputs of XOR gate 24 and XOR gate 28 are used as inputs for NOR gate 26 which provides an active high output when the source operand is not needed in performance of the raster operation.

Multiplexer 12 receives the outputs from multiplexer 10 and generates signals DEST0_RSLT and DEST-1_RSLT fed into destination decode circuit 23 to determine if read or write operations need to be performed at the destination address. In destination decode circuit 23, inverter 16 inverts DEST0_RSLT and applies the result to AND gate 18 and OR gate 20. AND gate 18 is responsive to the output from inverter 16 along with DEST1_RSLT for generating signal NO_DEST_WR. The output of AND gate 18 is active high when there is no requirement for writing a new value into the destination operand address. OR gate 20 employs the output of inverter 16 along with DEST-1_RSLT to generate output NO_DEST_RD of which is active high if the destination operand is not needed in order to perform the raster operation.

Multiplexer 14 further receives the output from multiplexer 12 and uses the destination value DEST to select DEST0_RSLT OR DEST1_RSLT as the new destination value NEW_DEST, the new destination value representing the result of the raster operation performed on the pattern, source and destination operands. However, the destination decode circuit determines whether this value needs to be written back into memory. Since the new value may be the same as the value that presently exists in the destination memory location, a writing operation may not be necessary.

Figures 4B, 6, 7:
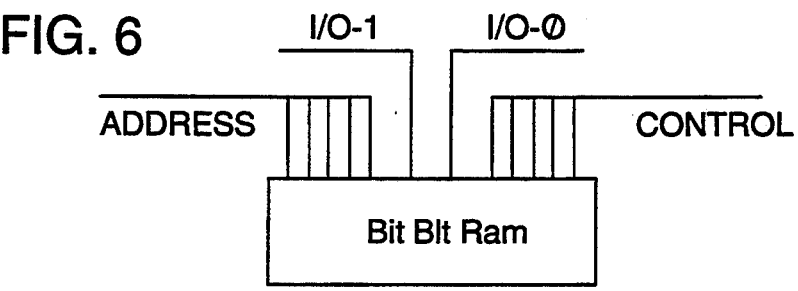
FIG. 4B is a truth table for a raster operation.
FIG. 6 is a block diagram of a BLT image storage memory.
FIG. 7 is a chart showing the decode logic for the destination bits used to control the BLT memory of FIG. 6.

The raster opcode represents truth table values for the raster operation to be performed between the source, destination and pattern operands; when there are three operands used in a raster operation, there are $2^3$ possible results. Since the raster opcode is eight bits wide, each bit could represent one result from a given raster operation. To explain further, FIG. 4B illustrates the truth table for equation 2. When the pattern operand is equal to zero, there are four possible results for the destination value DEST_VAL depending on the values of the source and destination operands. When the source operand is also known, there are only two possible values for the raster operation, and if all operand values are known, a given raster operation can have one possible value. The circuit uses this relationship to decode a given raster operation according to its associated truth table values.

To encode the raster opcode for the raster operation of equation 2, the values in FIG. 4B are employed in relation to the circuit in FIG. 4A. When the pattern operand is equal to zero (PAT=0), the raster opcode is supplied to multiplexer 10, and the first bit of the raster opcode is output on pin 1Y (ROP0=1Y). When the source operand is additionally equal to zero (SRC=0), the value from multiplexer 10 lead 1Y is output on multiplexer 12 output lead Q1. If the destination operand is additionally zero (DEST=0), the value on lead Q1 from multiplexer 12 is the output of multiplexer 14. Therefore, when pattern, source and destination operands are all equal to zero (PAT =SRC=DEST=0), the output of multiplexer 14 is equal to the first bit of the raster opcode and the first raster opcode bit is set to the destination value of the first entry in FIG. 4B (ROP0-=NEW_DEST=0). When the pattern operand is equal to one (PAT=1), the second bit of the raster opcode is placed on multiplexer 10 output lead 1Y (ROP=1Y). If the source operand is equal to zero (SRC=0), the signal on multiplexer 10 lead 1Y is output on multiplexer 12 lead Q1. When the destination operand is also equal to zero (DEST=0), the signal on multiplexer 12 lead Q1 is the output of multiplexer 14. Therefore, the second raster opcode bit ROP1 is equal to the output of multiplexer 14 which is set equal to the destination value of the fifth entry in FIG. 4B (ROP1-=DEST_VAL=0). This procedure is carried out for each entry in FIG. 4B until there is one raster operation result associated with each raster opcode bit. Completing the mapping of the truth table in FIG. 4B from the decode circuit in FIG. 4A, the raster opcode for the raster operation in equation 2 is ROP[0 . . . 7]=00100111. Column 5 in FIG. 4B shows the mapping of pattern, source and destination operand values to a specific raster opcode bit.

When a bitblt is performed that uses, for example, the raster operation in equation 2, the image control system reads the raster opcode from memory and sends it to the circuit in FIG. 4A. If the value of the pattern operand is one (PAT=1), the outputs of multiplexer 10 are ROP1-=1Y=0, ROP3=2Y=0, ROP5=3Y=1, and ROP7-=4Y=1. If the source operand is equal to zero (SRC=0), the outputs of multiplexer 12 are ROP1-=1Y=Q1=0, and ROP5=3Y=Q2=1. When the destination operand is equal to one (DEST=1), the raster result, which is equal to the output of multiplexer 14, is one corresponding to the sixth entry in FIG. 4B (ROP5=3Y=Q2=NEW$_{13}$ DEST=1).

The circuit of FIG. 4A determines whether operands are necessary to complete the raster operation by decoding raster opcode signals and signal pairs. When the output of pattern decode circuit 39, NO_PAT_RD, is asserted high, the memory control system does not need to fetch the pattern data to generate a result, the pattern decode circuit 39 determining whether the pattern operand will have any effect on the final result by exclusive ORing raster opcode bit pairs. Inasmuch as an exclusive OR is asserted high as the inputs are different, when opcode bits ROP0 and ROP1, for example, are the same, XOR 30 will be asserted low. When ROP0=ROP1, ROP2=ROP3, ROP4=ROP5, and ROP6=ROP7, the pattern operand does not need to be read, as relating to the opcode decoding performed by multiplexer 10. When pairs of inputs to multiplexer 10 are equal, the output of multiplexer 10 will be the same, independent of the selection value PAT. If the raster opcode supplied to multiplexer 10 is, for example, ROP[0 . . . 7]=00111100, the value output by multiplexer 10 for a pattern operand value equal to one (PAT=1) is ROP0=1Y=0, ROP2=2Y=1, ROP4=3Y=1, and ROP6=4Y=0. However, when the pattern operand value is equal to zero (PAT=0), the outputs of multiplexer 10 are the same, ROP1=1Y=0, ROP3=2Y=1, ROP5=4Y=1, and ROP7=4Y=0, because the raster opcode bit pairs are equal. Since the outputs of multiplexer 10 will be the same regardless of the value input on the multiplexer selection input, the pattern operand does not need to be read from memory or supplied to multiplexer 10. Referring to pattern decode circuit 39, inasmuch as ROP0=ROP1=0, the output of exclusive OR gate 30 is equal to zero, and since ROP2=ROP3=1, the output of exclusive OR gate 32 is zero. Raster opcode bit ROP4 is equal to raster opcode bit ROP5 (ROP4=ROP5=1), while raster opcode bit ROP6 is equal to raster opcode bit ROP7 (ROP6=ROP7=0). Therefore, the output of exclusive OR gate 34 is zero and the output of exclusive OR gate 36 is likewise zero. When the outputs from exclusive OR gates 30, 32, 34 and 36 are all zero, the output from NOR gate 38 is one, indicating that the output of multiplexer 10 will be the same value regardless of the pattern operand value.

Extending the same reasoning to the source operand read signal NO_SRC_RD, if both A inputs of multiplexer 12 are equal to their corresponding B inputs (e.g. A1=B1, A2=B2), then the outputs of multiplexer 12 (Q$_1$, Q$_2$) will be independent of the source operand value SRC used as the selection input. Source decode circuit 29 generates an active high signal NO_SRC_RD when the source operand would have no effect on the final raster operation value. For example, if the raster operation in equation 2 is decoded by the circuit in FIG. 4A when the pattern operand value is equal to one (PAT=1), the source operand does not have to be known to generate a result. As seen from above, for the raster opcode of equation 2, when the pattern operand is equal to one (PAT=1), the outputs of multiplexer 10 are ROP1=1Y=0, ROP3=2Y=0, ROP5=3Y=1, and ROP7=4Y=1. If the source operand is equal to zero (SRC=0), the outputs of multiplexer 12 are ROP1=1Y=Q1=0, and ROP5=3Y=Q2=1. When the source operand is equal to one (SRC=1), the outputs of multiplexer 12 do not change, ROP3=2Y=Q1=0, and ROP7=4Y=Q2=1. Therefore, when the pattern operand is equal to one, the source operand does not have to be known to generate the correct raster operation result. When the value on multiplexer 10 output lead 1Y is equal to the value on multiplexer 10 output lead 2Y, the output of exclusive OR gate 24 will be zero. If the value on multiplexer output lead 3Y is equal to the value of multiplexer output lead 4Y, the output of exclusive OR gate 28 will also be zero and the output of NOR gate 26 will be one (NO_SRC_RD=1). This corresponds to the fact that the source operand does not have to be read to determine the raster operation result.

The destination decode circuit 23 generates an active high signal, NO_DEST_RD, when the destination operand will have no effect on the final logical operation result. (Circuit 23 also extends its decoding to generate a no destination write signal, NO_DEST_WR, if the present destination operand will not be changed by performing the raster operation.) When the outputs from multiplexer 12 are equal (Q1=Q2) or when Q1 is zero and Q2 is one, there is no reason to read the destination operand since the output from multiplexer 14 is independent of the value on the input selection lead of multiplexer 14. In accordance with this determination, the destination read signal in circuit 23 is asserted high (NO_DEST_RD=1). However, when the outputs from multiplexer 12 are equal, the raster operation result still has to be written into the destination operand address. Accordingly, the destination write signal in circuit 23 is asserted low (NO_DEST_WR=0).

If the value on multiplexer 12 output lead Q1 is zero and the value on multiplexer 12 output lead Q2 is one (Q1=0, Q2=1), there is no reason to read or write the destination operand value from memory inasmuch as the result of the raster operation NEW_DEST is equal to the destination operand value DEST. Therefore, the destination operand does not have to be read from memory and the raster operation result does not have to be written into the destination operand address. For example, if the output values from multiplexer 14 are Q1=0 and Q2=1 and the destination operand is zero (DEST=0), the output of multiplexer 14 is also zero (NEW_DEST=0) indicating the destination operand and the raster operation result are equal (DEST=NEW_DEST). However, when the output values from multiplexer 14 are Q1=0, Q2=1 and the destination operand value is one (DEST=1), the output of multiplexer 14 is also one (NEW DEST=1), and therefore the destination operand is again equal to the raster operation result. Since the destination operand is always equal to the raster operation result, when Q1=0 and Q1=1, the destination operand read signal is asserted high (NO_DEST_RD=1) and the destination operand write signal is asserted high (NO_DEST_WR=1).

FIG. 5 illustrates how raster operations are performed for eight bit pixel displays, eight bit pixel control typically being used for color or gray level displays as opposed to single bit pixel control for monochrome systems. FIG. 5 corresponds to FIG. 4 except the number of components is increased as indicated so that eight bits of pattern, source and destination data are decoded. The raster opcode is first coupled through eight quad 2:1 multiplexers where each multiplexer decodes the opcode bus ROP[0 ... 7] in the same manner as multiplexer 40. Each bit of pattern operand bus PAT[0 ... 7] is applicable to a different quad multiplexer, where PAT0 is coupled to the first quad multiplexer, PAT1 to the second quad multiplexer, and so on. The pattern decode circuit 69 is the same as the pattern decode circuit in FIG. 4A, inasmuch as its configuration is based on the number of raster opcode bits independent of the operand bit length. Each quad 2:1 multiplexer will drive a corresponding dual multiplexer identical to the configuration between multiplexer 40 and multiplexer 42. Source operand bit SRC0 is applicable to control the dual multiplexer that is fed by the quad multiplexer controlled by pattern operand bit PAT0. Successive source operand bits are applicable in a similar manner wherein the second source opcode bit SRC1 controls the dual multiplexer driven by the quad multiplexer controlled by pattern operand bit PAT1 and so on. Thus, there are eight dual multiplexers, one for each source operand bit.

Source operand decode circuit 59 requires eight sets of exclusive OR gates similar to gates 54 and 58, one set for each quad multiplexer output. The sixteen exclusive OR outputs feed a sixteen input NOR gate represented by NOR gate 56. The output of NOR gate 56, NO_SRC_RD, is active high when none of the source operand bits are needed to a determination of the new destination value. Each dual multiplexer drives a corresponding single 2:1 multiplexer in a configuration similar to that between multiplexers 42 and 44. The multiplexers corresponding to source bits SRC[0 ... 7] supply the multiplexers that are controllable by the corresponding destination bits DEST[0 ... 7]. For example, the dual multiplexer controlled by SRC0 is coupled to the multiplexer controlled by DEST0, the dual multiplexer controlled by SRC1 is coupled to the multiplexer controlled by DEST1, and so on. The output from each destination controlled multiplexer provides one bit of the new destination value NEW_DEST[0 ... 7], where each new destination value bit is output by the multiplexer controlled by the corresponding destination bit (e.g. multiplexer controlled by DEST0 outputs NEW_DEST0, multiplexer controlled by DEST1 outputs NEW_DEST1, etc.).

Destination decode circuit 53 accepts all the outputs from the source operand controllable multiplexer DEST0_RSLT[0 ... 7], DEST1 RSLT[0 ... 7]. The upper output word from each dual multiplexer DEST0_RSLT[0 ... 7] will be complemented by eight inverters corresponding to inverter 46, and each inverter output along with the lower destination result words DEST1_RSLT[0 ... 7] is provided to a sixteen input AND gate 48. The output of AND gate 48, NO_DEST_WR, is active high when none of the new destination bits NEW DEST[0 ... 7] needs to be written into the destination operand memory. Dual multiplexer outputs DEST0 RSLT[0 ... 7] are also supplied to eight, two input exclusive OR gates, similar to exclusive OR gate 50, along with the eight dual multiplexer outputs DEST1_RSLT[0 ... 7]. The outputs from the eight, two input exclusive OR gates are coupled as inputs to an eight input AND gate 52. The output from AND gate 48 and the output from AND gate 52 are input into OR gate 55 generating output NO_DEST_RD that is active high when the eight bit destination operand DEST[0 ... 7] does not have to be read in order to generate a raster operation result.

Destination decode circuit 53 illustrates decode logic for eight bit pixel control where all eight bits associated with a given pixel are controlled at the same memory address location. To generate the correct raster opcode result, the destination operand read and write operations are controlled based on the relationship between memory access requirements for all eight bits of the pixel control word. For example, when no destination read or write is required to be performed on any bit of the pixel control word (DEST0_RSLT[0 . . . 7]=00000000, DEST1_RSLT[0 . . . 7]=11111111), the output of AND gate 48 is one (NO_DEST_WR=1) and the output of OR gate 53 is one (NO_DEST_RD=1) indicating no destination operand read or destination operand write is necessary. Similarly, if each bit of the pixel control word requires a destination write but no destination read (DEST0_RSLT0=DEST1_RSLT0, DEST0_RSLT1=DEST1_RSLT1, . . . DEST0_RSLT7=DEST1_RSLT7) the output of AND gate 48 is zero (NO_DEST_WR=0) and the output of OR gate 55 is one (NO_DEST_RD=1) indicating only a destination operand write is necessary. In any other bit combination, both a destination operand read and a destination operand write (NO_DEST_WR=NO_DEST_RD=0) are performed for each pixel control bit. For example, if it is necessary to read a destination operand bit and write the associated result bit back into memory, the remaining seven destination operand bits will also be read from memory and the associated result bits written back into memory. To further illustrate, for DEST0_RSLT[0 . . . 7]=10000000, DEST1_RSLT[0 . . . 7]=01111111, the output of AND gate 48 is zero (NO_DEST_WR=0) and the output of OR gate 55 is zero (NO_DEST_RD=0) indicating both a destination operand read and a destination operand write are to be performed. For a graphics system where each bit of the pixel control word is addressed by a separately controllable memory component, the only bit that requires either a destination operand read or a destination operand write is the least significant bit (DEST0_RSLT0=1, DEST1_RSLT0=0). However, when more than one bit is controlled at the same memory address location, the additional bits (DEST0_RSLT[1 . . . 7], DEST1_RSLT[1 . . . 7] must also perform a destination operand read and a destination operand write to prevent incorrect data from being written back into associated memory locations.

The outputs NEW_DEST[0 . . . 7], NO_DEST_WR, NO_DEST_RD, NO_SRC_RD, and NO_PAT_RD are supplied to a state machine (or a programmed processor) within system 2 which uses the information to access or not access memory in accordance with the image display operation. In typical control flow in response to a block transfer command, the image control system 2 supplies an eight bit raster opcode ROP[0 . . . 7] to the circuit in FIG. 5. The image control system then checks the output of pattern decode circuit 69 NO_PAT_RD and accesses pattern data PAT[0 . . . 7] only if needed (e.g. NO_PAT_RD=0). If the pattern operand is not needed to generate a result (e.g. NO_PAT_RD=1), then the image control system will skip reading the pattern operand from memory and next check source decode circuit 59 to determine if source operand SRC[0 . . . 7] is needed. If the source operand is required to determine a new result (NO_SRC_RD=0), then the source operand will be read from the image storage system and supplied to eight dual multiplexers corresponding to multiplexer 42. If the source operand, however, is not needed to calculate the raster operation (NO_SRC_RD=1), then the image control system skips the source read and goes on to check destination decode circuit 53.

The image control system checks the destination decode circuit outputs NO_DEST_RD and NO_DEST_WR. If the destination operand is needed to determine the result of the raster operation (NO_DEST_RD=0), the value is read from memory and supplied to eight single 2:1 multiplexers corresponding to multiplexer 44. If the destination operand is not needed (NO_DEST_RD=1), the image control system checks to see if the result of the raster operation NEW_DEST[0 . . . 7] needs to be written into memory. If the destination write signal is enabled (NO_DEST_WR=1), NEW_DEST[0 . . . 7] is not written into memory. If a destination write is required (NO_DEST_WR=0), the new destination value NEW DEST[0 . . . 7] is written into the memory address of the destination operand DEST[0 . . . 7]. The image control system can check the destination write signal before the destination read signal. Since a destination read is not needed if the result is not written into memory, the state machine can skip reading NO_DEST_RD if NO_DEST_WR=1. The address is then incremented to the next pixel location in the block transfer and the aforementioned raster operation decode is repeated. This process is performed for each pixel in the area defined in the bitblt, and after the block transfer has been completed, the control system supplies a new raster operation and starting memory location for a next bitblt.

The invention can be customized to employ special image display hardware to reduce further the number of required memory cycles required to perform a raster operation. FIG. 6 illustrates a memory component as further described and claimed in co-pending patent application Ser. No. 07/617,359, filed Nov. 23, 1990 and entitled BLT RAM IMAGE PROOCESSOR MEMORY FOR EXPEDITING MEMORY OPERATION. This memory component is designed to minimize the time required to perform a bitblt in that the unit per-forms logical operations on addressed data in memory without having to supply new data values to the memory. Logical operations are determined via data leads I/0_1 and I/0_2. As a result, additional time is saved inasmuch as the destination opcode does not have to be read to change the cur rent value. Such memory system i s employed to maximum efficiency in conjunction with the invention as set forth herein. The raster opcode that is decoded in FIG. 5 may, for example, determine the value of the destination operand is going to be complemented. In the previously described hardware configuration, wherein standard memory devices may be used, the destination code is suitably read, complemented, and then written back into memory. Therefore, a destination read would be undertaken (e.g. NO_DEST_RD=0), and the inverted value NEW_DEST[0 . . . 7] would be written back into memory. However, if the memory device according to FIG. 6 is used, the destination read is not necessary. After the pattern operand, source operand and raster opcode have been decoded to determine that the destination opcode needs to be complemented, the destination results DEST0_RSLT[0 . . . 7] and DEST1_RSLT[0 . . . 7] are fed directly into their corresponding bitblt RAM locations which toggle the existing destination operand bits. In addition, the destination decode circuit indicates to the image control system that no destination operand read is required (e.g. NO_DEST_RD=1).

FIG. 7 illustrates four operations that can be performed by the memory device of this type shown in FIG. 6. The destination result bits DEST0_RSLT[0 . . . 7], DEST1_RSLT[0 . . . 7] supply control for the memory devices, and when the corresponding bits in DEST0[0 . . . 7] and DEST1[0 . . . 7] (e.g. DEST0[0], DEST1[0]; DEST0[1], DESTl[1]; DEST0[2], DESTi[2]; etc.) are zero, then the destination value presently existing in memory is cleared. When DEST0 is equal to one and DEST1 is a zero, the destination operand will be toggled (complemented) and when DEST0 is zero and DEST1 is one, the destination is not affected, i.e., a no-op is performed in regard to the memory device; when DEST0=DEST1=1, the destination is set to one.

The present invention can be implemented in software for the purpose of reducing memory cycle access time. In a software controlled bitblt system, the raster opcode is supplied to a microprocessor which loads the value into an internal register where it is decoded to determine if any operands are required; if not, the processor proceeds to the next address. If the raster operation does require an operand, the processor may load the value into another internal register and apply the operand. If a given operand is not needed, the microprocessor skips a memory read and determines if a next operand is required, etc. Thus, the time to perform the operation is shortened by reducing the number of memory cycles. Furthermore, the number of internal registers needed to decode the raster operation is reduced since loading of unnecessary operands into processor registers can be avoided.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for transfer of graphics data in a memory, said transferred data being defined according to a predetermined logic expression representative of a logic relationship involving first and second operands, each operand being representative of respective data with at least one of said first and second operands being representative of graphics data in said memory, said system comprising:

image modification means for managing said memory for selectively effecting a given memory operation representing said predetermined logic expression with respect to said operands and providing an image output per said predetermined logic expression, and means for identifying, before engaging at least one of said first and second operands, the logical effect that one of said operands will have on the image output per said predetermined logic expression and causing said image modification means to manage said memory with respect to other than said one of said operands when it is determined said one of said operands fails to have a logical effect on said output.

2. The system according to claim 1 including means for receiving and multiplexing predetermined operation opcodes which determine a logical result in conjunction with said first and second operands.

3. The system according to claim 1 wherein said first operand relates to source image data and said second operand relates to destination image data.

4. A system for transfer of graphics data in a memory, said transferred data being defined according to a predetermined logic expression representative of a logic relationship between first, second and third operands, each operand being representative of respective data with at least one of said first, second and third operands being representative of graphics data in said memory, said system comprising:

image modification means for managing said memory for selectively effecting a given operation representing said predetermined logic expression with respect to said first, second, and third operands and for providing an image output per said predetermined logic expression, and means for identifying, before engaging said first and second operands, the logical effect that one of said first and second operands will have on the image output per said predetermined logic expression, and causing said image modification means to manage said memory with respect to other than said one of said first and second operands when it is determined said one of said first and second operands fails to have a logical effect on said image output.

5. The system according to claim 4 wherein one of said first, second and third operands relates to source image data, another of said operands relates to destination image data, and the remaining operand relates to pattern data.

6. The graphics system according to claim 4 including means receiving and multiplexing operation opcodes as determined by a desired logical operation with respect to said first, second and third operands.

7. A graphics system for associating a plurality of operands including at least first and second image operands, each operand being representative of graphics data, said system comprising:

image modification means for selectively effecting a predetermined raster logic operation with respect to said plurality of operands and providing an image output, and primary means for determining, in a first determination before engaging said first operand, the logical effect that said first operand will have on the image output per said predetermined raster logic operation and accessing said first operand for employment by said image modification means when it is determined that it has a positive logical effect on the image output per said predetermined raster logic operation.

8. The graphics system according to claim 7 including image data storage means for holding said operands, and wherein said primary means includes means for accessing, from said image storage means, said first operand determined to have a logical effect on the image output.

9. The graphics system according to claim 8 including secondary means for employing said first operand determined to have a logical effect on the image output in conjunction with said predetermined raster logic operation in a second determination for determining the logical effect of one or more additional operands on said image output.

10. The system according to claim 9 wherein said secondary means performs said second determination after said primary means determines per said first determination the logical effect of said first operand and accesses the same, said system further comprising means for accessing said additional operands.

11. The system according to claim 9 wherein further operands as determined to have effect on image output are employed by said image modification means for determining image output.

* * * * *